US010360460B2

(12) United States Patent
Jiang et al.

(10) Patent No.: US 10,360,460 B2
(45) Date of Patent: Jul. 23, 2019

(54) METHOD AND DEVICE OF LANE DEPARTURE WARNING AND AUTOMOBILE DRIVING ASSISTANCE SYSTEM

(71) Applicant: Beijing Smarter Eye Technology Co. Ltd., Beijing (CN)

(72) Inventors: An Jiang, Beijing (CN); Ran Meng, Beijing (CN); Haitao Zhu, Beijing (CN); Feng Cui, Beijing (CN); Qiwei Xie, Beijing (CN)

(73) Assignee: BEIJING SMARTER EYE TECHNOLOGY CO. LTD., Beijing (CN)

( * ) Notice: Subject to any disclaimer, the term of this patent is extended or adjusted under 35 U.S.C. 154(b) by 225 days.

(21) Appl. No.: 15/474,755

(22) Filed: Mar. 30, 2017

(65) Prior Publication Data
US 2017/0262713 A1 Sep. 14, 2017

(30) Foreign Application Priority Data
Feb. 3, 2016 (CN) .......................... 2016 1 0076787

(51) Int. Cl.
*G06K 9/00* (2006.01)
*B60W 30/12* (2006.01)
*G08G 1/16* (2006.01)

(52) U.S. Cl.
CPC ......... *G06K 9/00798* (2013.01); *B60W 30/12* (2013.01); *G08G 1/167* (2013.01)

(58) Field of Classification Search
None
See application file for complete search history.

(56) References Cited

U.S. PATENT DOCUMENTS 5,225,827 A * 7/1993 Persson ................. B60Q 9/008
  250/202
8,204,276 B2 * 6/2012 Higuchi ................. G08G 1/16
  382/100

(Continued)

OTHER PUBLICATIONS

Pohl, Jochen, Wolfgang Birk, and Lena Westervall. "A driver-distraction-based lane-keeping assistance system." Proceedings of the Institution of Mechanical Engineers, Part I: Journal of Systems and Control Engineering 221.4 (2007): 541-552. (Year: 2007).*

*Primary Examiner* — Samah A Beg
(74) *Attorney, Agent, or Firm* — Novick, Kim & Lee, PLLC; Allen Xue

(57) ABSTRACT

A lane departure warning method includes steps of: collecting a road image by an imaging device; detecting a lane marking in accordance with the road image, so as to extract a position of the lane marking and an angle of the lane marking relative to a running direction of the vehicle; acquiring steering information and a movement speed of the vehicle by an OBD system; judging whether or not the vehicle is unconsciously running on the lane marking in accordance with the position of the lane marking, the angle of the lane marking relative to the running direction of the vehicle and the steering information of the vehicle; in the case that the vehicle is unconsciously running on the lane marking, recording a duration within which the vehicle is unconsciously running on the lane marking; and judging whether or not to send a lane departure warning to the vehicle.

15 Claims, 6 Drawing Sheets

(56) References Cited

U.S. PATENT DOCUMENTS

| | | | |
|---|---|---|---|
| 9,340,227 B2* | 5/2016 | Bajpai | B62D 6/00 |
| 9,946,940 B2* | 4/2018 | Gupta | G06K 9/00798 |
| 2002/0095246 A1* | 7/2002 | Kawazoe | B62D 15/025 |
| | | | 701/1 |
| 2005/0273262 A1* | 12/2005 | Kawakami | B62D 15/025 |
| | | | 701/301 |
| 2010/0145575 A1* | 6/2010 | Switkes | B62D 15/025 |
| | | | 701/41 |
| 2010/0182139 A1* | 7/2010 | Chen | B60W 30/12 |
| | | | 340/435 |
| 2011/0216938 A1* | 9/2011 | Suzuki | G06K 9/00 |
| | | | 382/103 |
| 2012/0062745 A1* | 3/2012 | Han | B62D 15/029 |
| | | | 348/148 |
| 2012/0320210 A1* | 12/2012 | Imai | B60W 30/12 |
| | | | 348/148 |
| 2013/0238192 A1* | 9/2013 | Breu | G01S 13/726 |
| | | | 701/41 |
| 2013/0335213 A1* | 12/2013 | Sherony | G08G 1/167 |
| | | | 340/439 |
| 2014/0176716 A1* | 6/2014 | Wallat | B62D 15/025 |
| | | | 348/148 |
| 2017/0148327 A1* | 5/2017 | Sim | G08G 1/167 |
| 2018/0134290 A1* | 5/2018 | Kataoka | B62D 15/025 |
| 2018/0154938 A1* | 6/2018 | Kataoka | B60W 30/12 |

\* cited by examiner

METHOD AND DEVICE OF LANE DEPARTURE WARNING AND AUTOMOBILE DRIVING ASSISTANCE SYSTEM

TECHNICAL FIELD

The present disclosure relates to the field of image processing technology, in particular to a lane departure warning method, a lane departure warning device, and a vehicle assistant driving system.

BACKGROUND

A lane departure warning system is used to give a warning to drivers who are in a sleepy, fatigue-driving or attention-deficit state, so as to prevent the occurrence of traffic accidents due to lane departure.

Currently, the lane departure warning systems adopted in foreign countries mainly include an AURORA system, an AutoVue system, a Mobileye_AWS system and a Driver Support System (DSS), and the lane departure warning systems adopted in China mainly include a JLUVA-1 system, and an embedded, Digital Signal Processor (DSP)-based lane departure warning system. A conventional lane departure warning model is mainly based on one of the followings: a position of a vehicle in a current lane, a coming departure amount of the vehicle, and a duration within which the vehicle is running on a boundary of the lane. These methods are mainly used to accurately determine a distance between a lane marking and the vehicle by measuring the position of the vehicle in the lane. At this time, it is necessary to define a camera, so as to establish a geometrical imaging model consisting of the camera, the vehicle and a road surface. However, the establishment of the geometrical imaging model may be readily affected by such factors as a type of the camera, a type of a lens, an installation position of the camera, a type of the vehicle and a type of a road.

Hence, there is an urgent need to provide a scheme so as to overcome the above-mentioned defect.

SUMMARY

A main object of the present disclosure is to provide a lane departure warning method, a lane departure warning device and a vehicle assistant driving system, so as to solve, at least partially, the technical problem about how to give a warning in a quick and effective manner in the case of lane departure.

In one aspect, the present disclosure provides in some embodiments a lane departure warning method, an imaging device being arranged on a central axis of a front windshield of a vehicle, the lane departure warning method at least including steps of: collecting a road image by the imaging device; detecting a lane marking in accordance with the road image, so as to extract a position of the lane marking and an angle of the lane marking relative to a running direction of the vehicle; acquiring steering information and a movement speed of the vehicle by an On-Board Diagnostic (OBD) system; judging whether or not the vehicle is unconsciously running on the lane marking in accordance with the position of the lane marking, the angle of the lane marking relative to the running direction of the vehicle and the steering information of the vehicle; in the case that the vehicle is unconsciously running on the lane marking, recording a duration within which the vehicle is unconsciously running on the lane marking; and judging whether or not to send a lane departure warning to the vehicle in accordance with the duration within which the vehicle is unconsciously running on the lane marking and the movement speed of the vehicle.

In another aspect, the present disclosure provides in some embodiments a lane departure warning device, an imaging device being arranged on a central axis of a front windshield of a vehicle, the lane departure warning device at least including: a collection unit configured to collect a road image by the imaging device; an extraction unit configured to detect a lane marking in accordance with the road image, so as to extract a position of the lane marking and an angle of the lane marking relative to a running direction of the vehicle; an acquisition unit configured to acquire steering information and a movement speed of the vehicle by an OBD system; a first judgment unit configured to judge whether or not the vehicle is unconsciously running on the lane marking in accordance with the position of the lane marking, the angle of the lane marking relative to the running direction of the vehicle and the steering information of the vehicle; a recording unit configured to, in the case that the vehicle is unconsciously running on the lane marking, record a duration within which the vehicle is unconsciously running on the lane marking; and a second judgment unit configured to judge whether or not to send a lane departure warning to the vehicle in accordance with the duration within which the vehicle is unconsciously running on the lane marking and the movement speed of the vehicle.

In yet another aspect, the present disclosure provides in some embodiments a vehicle assistant driving system, including the above-mentioned lane departure warning device.

As compared with the related art, the technical solutions in the embodiments of the present disclosure at least have the following beneficial effects.

According to the embodiments of the present disclosure, the imaging device is arranged on the central axis of the front windshield of the vehicle so as to collect the road image. Next, the lane marking is detected in accordance with the road image, so as to extract information about the position of the lane marking and the angle of the lane marking relative to the running direction of the vehicle. Next, the steering information of the vehicle is acquired. Then, whether or not to send the lane departure warning is judged in accordance with the position of the lane marking, the angle of the lane marking relative to the running direction of the vehicle, and the steering information of the vehicle. As a result, it is able to send the lane departure warning in a quick and effective manner.

It should be appreciated that, the products in the embodiments of the present disclosure are unnecessarily to have all the above-mentioned beneficial effects at the same time.

BRIEF DESCRIPTION OF THE DRAWINGS

The following drawings are provided to facilitate the understanding of the present disclosure, and constitute a portion of the description. These drawings and the following embodiments are for illustrative purposes only, but shall not be construed as limiting the present disclosure. Obviously, the following drawings merely relate to some embodiments of the present disclosure, and based on these drawings, a person skilled in the art may obtain the other drawings without any creative effort. In these drawings.

These drawings and the descriptions thereof are not intended to limit a scope of the present disclosure in any way, and instead, a concept of the present disclosure may be apparent with reference to specific embodiments.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other equivalent or modified embodiments, which also fall within the scope of the present disclosure. These embodiments may be achieved in accordance with various ways defined and included in the appended claims.

It should be appreciated that, in the following description, many details are given so as to facilitate the understanding of the present disclosure. Obviously, the implementation of the present disclosure may be achieved without these details.

It should be further appreciated that, the embodiments and the technical features therein may be combined with each other to form technical solutions, in the case of no specific definition or no conflict.

Figure 1:
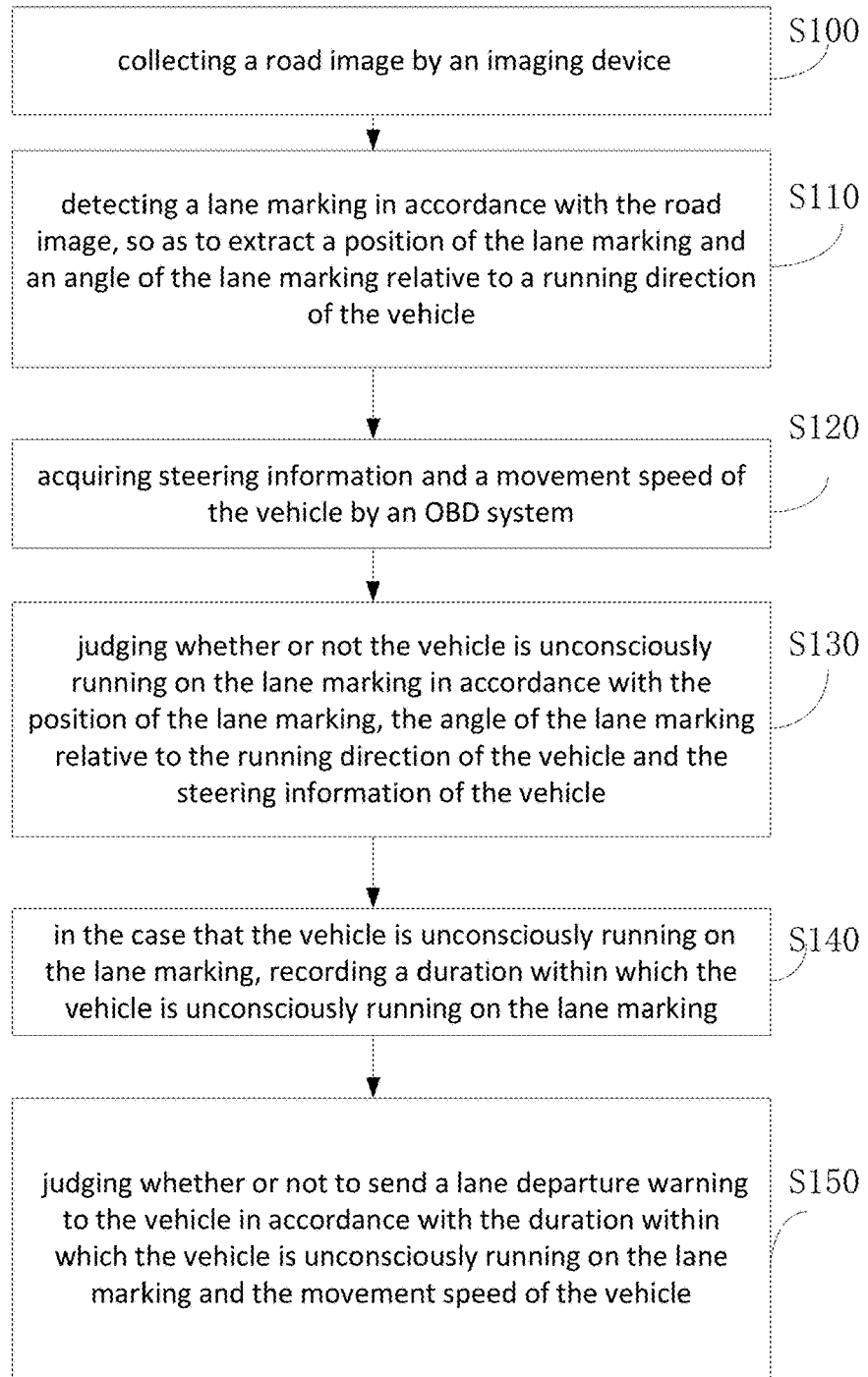
FIG. 1 is a flow chart of a lane departure warning method according to one embodiment of the present disclosure.

As shown in FIG. 1, the present disclosure provides in some embodiments a lane departure warning method. An imaging device is arranged on a central axis of a front windshield of a vehicle. The lane departure warning method may at least include the following steps.

Step S100: collecting a road image by the imaging device.

In this step, in order to ensure a running direction of the vehicle to be identical to an extending direction of an optical axis of the imaging device, the imaging device is required to be installed on the central axis of the front windshield of the vehicle. During the installation, a height and an elevation angle of the imaging device may be adjusted in such a manner that a head of the vehicle has a height not exceeding one fifth of a height of the image or does not appear in a field of view of the imaging device. In a possible embodiment of the present disclosure, in the field of view of the imaging device, the sky may have a height within the range from one fourth to one second of the height of the image.

Figure 2:
FIG. 2 is a schematic view showing a road image according to one embodiment of the present disclosure.

FIG. 2 illustratively shows the road image.

After the installation, the imaging device may be used to acquire the road image in front of the vehicle. The imaging device may include, but not limited to, a monocular video camera or camera, or a binocular video camera or camera. The vehicle may be an automobile.

Step S110: detecting a lane marking in accordance with the road image, so as to extract a position of the lane marking and an angle of the lane marking relative to the running direction of the vehicle.

Step S110 may further include the following steps.

Step S1102: subjecting the road image to pretreatment.

Usually, the acquired road image may include noises, so it is necessary to subject the road image to pretreatment, so as to remove the noises. This step may be achieved by configuring an image processing system. Generally speaking, the pretreatment on the road image may be completed by a built-in DSP imaging processing module in a vehicle assistant driving system.

Figure 3:
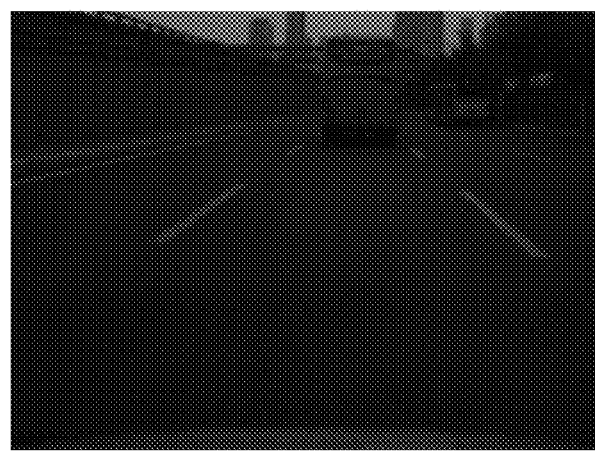
FIG. 3 is a schematic view showing a region-of-interest selected from the road image after gray processing according to one embodiment of the present disclosure.

Step S1102 may further include: Step S11022 of selecting a region-of-interest (ROI) from the road image, the ROI including information about the lane markings; Step S11024 of subjecting the ROI to gray processing (FIG. 3 illustratively shows a grayscale image of the ROI after the gray processing); and Step S11026 of subjecting the image acquired after the gray processing to low-pass filtration.

Figure 4:
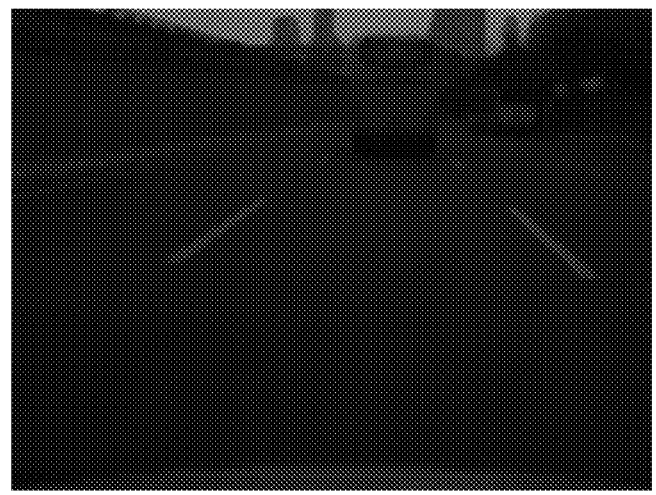
FIG. 4 is a schematic view showing an image acquired after low-pass filtration on the image in FIG. 5 is a schematic view showing an image acquired after contrast adjustment on the image in FIG. 4.

In other words, Steps S11022 to S11026 may be performed by the DSP image processing module, so as to subject the road image to pretreatment. FIG. 4 illustratively shows the image acquired after the low-pass filtration.

Figure 5:
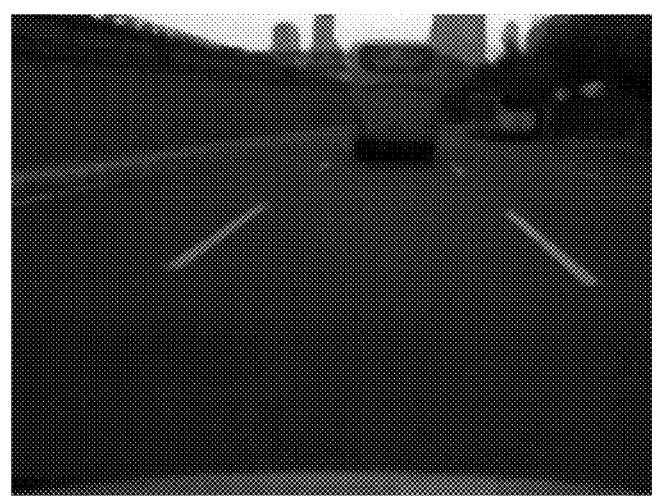

In order to prevent the quality of the road image from being adversely affected by rays in different climate conditions, in some possible embodiments of the present disclosure, Step S1102 may further include Step S11028 of subjecting the image acquired after the low-pass filtration to contrast adjustment. FIG. 5 illustratively shows the image acquired after contrast enhancement.

Figure 6:
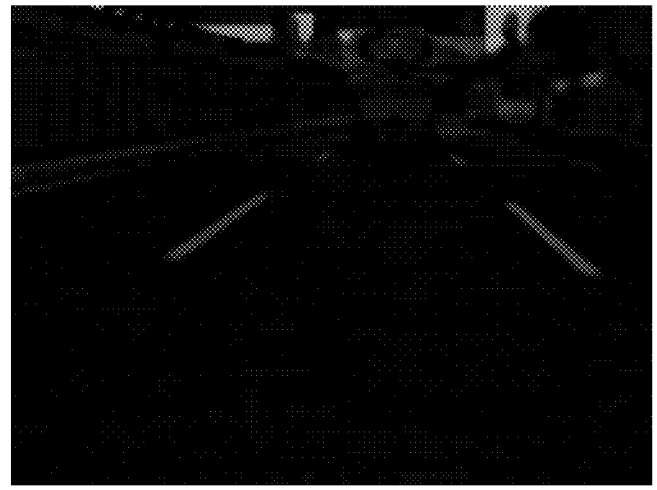
FIG. 6 is a schematic view showing a lane marking characteristic pattern according to one embodiment of the present disclosure.

Step S1104: subjecting a pretreatment result to morphological operation so as to extract a lane marking characteristic pattern. FIG. 6 illustratively shows the extracted lane marking characteristic pattern.

In this step, the step of subjecting the road image to the morphological operation may include subjecting the road image to top-hat operation using a structural element in a horizontal direction. The structural element has a length twice a width of the lane marking in the road image.

Step S11028 and Step 1104 may also be performed by the DSP image processing module.

It should be appreciated that, the above-mentioned method for extracting the lane marking characteristic pattern is merely for illustrative purposes, and any other known methods or any other methods that may occur in future may also fall within the scope of the present disclosure and thus will be incorporated herein by reference.

Step S1106: subjecting the lane marking characteristic pattern to topical self-adaptive binarization, so as to acquire a binary image.

A topical self-adaptive binarization method includes defining a neighboring region of a reference point, and comparing a grayscale value of the reference point and that of the neighboring region, so as to determine a threshold of a current point. Entire grayscale distribution of the image, rather than topical properties of the image, may be adversely affected by the noises or non-uniform illumination. Hence, in the embodiments of the present disclosure, the lane marking characteristic pattern may be subjected to the topical self-adaptive binarization.

Figure 7:
FIG. 7 is a schematic view showing a binary image acquired after topical self-adaptive binarization on the lane marking characteristic pattern according to one embodiment of the present disclosure.

Step S1106 may further include: Step S11062 of, with respect to each pixel in the lane marking characteristic pattern, calculating a difference between an average grayscale value of the pixel and an average grayscale value of a pixel at the neighboring region; Step S11064 of, in the case that the difference is greater than a predetermined threshold, proceeding to Step S11066, and otherwise proceeding to Step S11068; Step S11066 of setting a grayscale value of the pixel as 255; and Step S11068 of setting the grayscale value of the pixel as 0. FIG. 7 illustratively shows the binary image acquired after the lane marking characteristic pattern has been subjected to the topical self-adaptive binarization.

Step S1108: subjecting the binary image to Blob analysis, so as to determine an image block that conforms to a lane marking characteristic as the lane marking, and extract the position of the lane marking and the angle of the lane marking relative to the running direction of the vehicle.

Through the Blob analysis, it is able to acquire, from the image, information about the position of the lane marking, the angle of the lane marking relative to the running direction of the vehicle, and an area of the lane marking. In the embodiments of the present disclosure, the information about the position of the lane marking and the angle of the lane marking relative to the running direction of the vehicle may be extracted for the subsequent lane departure warning.

To be specific, Step S1108 may further include: Step S11082 of calculating a statistical attribute of each image block in the binary image, the statistical attribute including, but not limited to, one or more of center of mass, perimeter, area, direction, Euler number, eccentricity, length of principal axis, length of secondary axis, and a ratio of the length of principal axis to the length of secondary axis; Step S11084 of establishing a regression decision tree model in accordance with the statistical attribute and the lane marking characteristic; Step S11086 of determining whether or not the image block is the lane marking in accordance with the regression decision tree model; and Step S11088 of extracting a position of the image block that has been determined as the lane marking, and an angle of the image block relative to the running direction of the vehicle.

Figure 8:
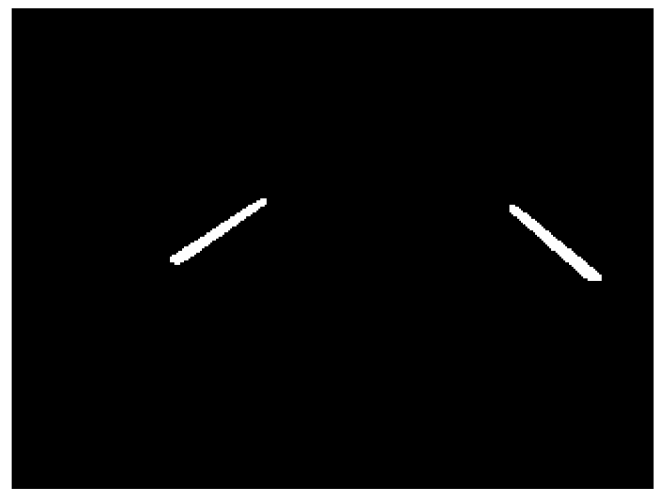
FIG. 8 is a schematic view showing the binary image after Blob analysis according to one embodiment of the present disclosure.

Identically, Step S1108 may also be performed by the built-in DSP image processing module in the vehicle assistant driving system. FIG. 8 illustratively shows the binary image after the Blog analysis.

It should be appreciated that, the above-mentioned method for extracting the position of the lane marking and the angle of the lane marking relative to the running direction of the vehicle is merely for illustrative purposes, and any other known methods or any other methods that may occur in future may also fall within the scope of the present disclosure and thus will be incorporated herein by reference.

Step S120: acquiring steering information and a movement speed of the vehicle by an OBD system.

In this step, the steering information (e.g., information about a steering lamp of the vehicle) and the movement speed of the vehicle may be acquired by the OBD system, and data collected by the OBD system may be transmitted via a Controller Area Network (CAN) bus. Through the OBD system, it is able to acquire the steering information, the movement speed, and information about a throttle and a brake of the vehicle. In the embodiments of the present disclosure, the steering information and the speed information among them may be used.

Step S130: judging whether or not the vehicle is unconsciously running on the lane marking in accordance with the position of the lane marking, the angle of the lane marking relative to the running direction of the vehicle and the steering information of the vehicle.

To be specific, Step S130 may include: Step S1302 of judging whether or not the running direction of the vehicle is being changed in accordance with the steering information of the vehicle; and Step S1304 of, in the case that the running direction of the vehicle is being changed, the lane marking is located at a predetermined region in the road image, and the angle of the lane marking relative to the running direction of the vehicle is within a predetermined range, determining that the vehicle is unconsciously running on the lane marking. In a possible embodiment of the present disclosure, the steering information may be information about the steering lamp.

Figure 9:
FIG. 9 is a schematic view showing a vehicle which is running normally according to one embodiment of the present disclosure.
Figure 10:
FIG. 10 is a schematic view showing the vehicle which is running on a lane marking according to one embodiment of the present disclosure.

FIG. 9 illustratively shows the vehicle which is running normally, and FIG. 10 illustratively shows the vehicle which is running on the lane marking. In FIGS. 9 and 10, white lines are used to represent bearings of the vehicle. In the case of a turning signal, it means that the vehicle is consciously running on the lane marking. In the case that no turning signal is given, the lane marking is located at a triangular region in the middle in FIG. 10 and the angle of the lane marking relative to the running direction of the vehicle is within a certain range (e.g., 50° to 130°), it means that the vehicle is unconsciously running on the lane marking.

Step S140: in the case that the vehicle is unconsciously running on the lane marking, recording a duration within which the vehicle is unconsciously running on the lane marking. During the actual application, the duration within which the vehicle is unconsciously running on the lane marking may be acquired in accordance with time points at which the road images are taken by the imaging device.

Step S150: judging whether or not to send a lane departure warning to the vehicle in accordance with the duration within which the vehicle is unconsciously running on the lane marking and the movement speed of the vehicle.

For example, in the case that the duration within which the vehicle is unconsciously running on the lane marking exceeds a predetermined threshold (e.g., 1 second) and the movement speed of the vehicle is greater than a predetermined threshold (e.g., 30 km/h), the lane departure warning may be sent so as to prompt a driver of the fact that the vehicle is running on the lane marking.

Although the above-mentioned steps have been described in order, it should be appreciated that, in order to achieve the mentioned effects, these steps may be performed simultaneously or in different orders, which also falls within the scope of the present disclosure.

Figure 11:
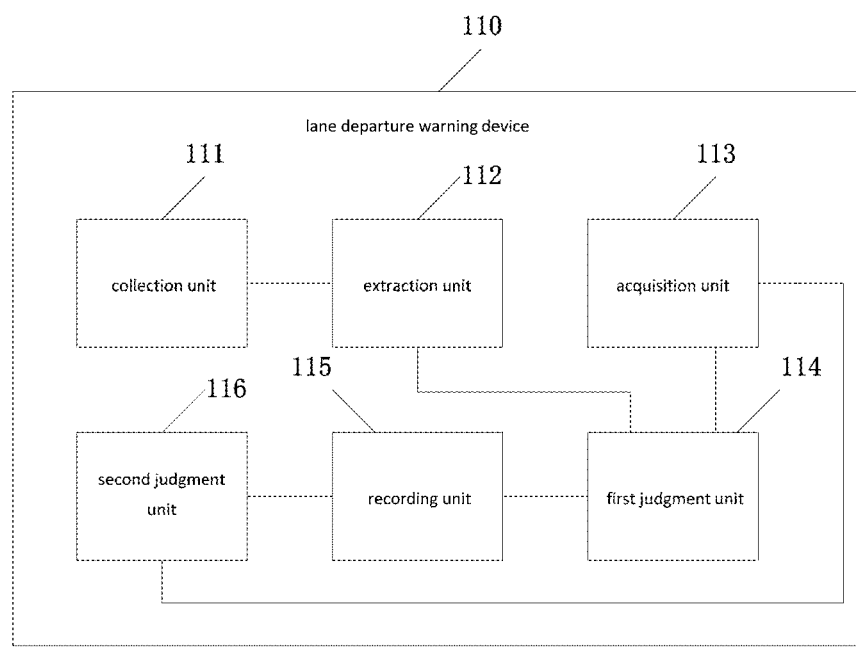
FIG. 11 is a schematic view showing a lane departure warning device according to one embodiment of the present disclosure.

Based on an identical inventive concept, the present disclosure further provides in some embodiments a lane departure warning device, and an imaging device is arranged on a central axis of a front windshield of a vehicle. As shown in FIG. 11, the lane departure warning device 110 may at least include a collection unit 111, an extraction unit 112, an acquisition unit 113, a first judgment unit 114, a recording unit 115, and a second judgment unit 116. The collection unit 111 is configured to collect a road image by the imaging device. The extraction unit 112, the acquisition unit 113, the first judgment unit 114, the recording unit 115 and the second judgment unit 116 are built in a vehicle assistant driving system. To be specific, the extraction unit 112 is configured to detect a lane marking in accordance with the road image, so as to extract a position of the lane marking and an angle of the lane marking relative to a running direction of the vehicle. The acquisition unit 113 is configured to acquire steering information and a movement speed of the vehicle by an OBD system. The first judgment unit 114 is configured to judge whether or not the vehicle is unconsciously running on the lane marking in accordance with the position of the lane marking, the angle of the lane marking relative to the running direction of the vehicle and the steering information of the vehicle. The recording unit 115 is configured to, in the case that the vehicle is unconsciously running on the lane marking, record a duration within which the vehicle is unconsciously running on the lane marking. The second judgment unit 116 is configured to judge whether or not to send a lane departure warning to the vehicle in accordance with the duration within which the vehicle is unconsciously running on the lane marking and the movement speed of the vehicle.

It should be appreciated that, the lane departure warning device may further include any other known structures, e.g., a processor and a memory. In order not to unnecessarily confuse the understanding of the present disclosure, these known structures are not shown in FIG. 11.

In some embodiments of the present disclosure, the extraction unit may include a pretreatment module, a first extraction module, a binarization module, and a second extraction module. The pretreatment module is configured to subject the road image to pretreatment. The first extraction module is configured to subject a pretreatment result to morphological operation so as to extract a lane marking characteristic pattern. The binarization module is configured to subject the lane marking characteristic pattern to topical self-adaptive binarization, so as to acquire a binary image. The second extraction module is configured to subject the binary image to Blob analysis, so as to determine an image block that conforms to a lane marking characteristic as the lane marking, and extract the position of the lane marking and the angle of the lane marking relative to the running direction of the vehicle.

In a possible embodiment of the present disclosure, the pretreatment module may include a selection module, a gray processing module, a filtration module and an adjustment module. The selection module is configured to select a ROI from the road image. The gray processing module is configured to subject the ROI to gray processing. The filtration module is configured to subject the image acquired after the gray processing to low-pass filtration. The adjustment module is configured to subject the image acquired after the low-pass filtration to contrast adjustment.

In a possible embodiment of the present disclosure, the first extraction module may include an operation module configured to subject the road image to top-hat operation using a structural element in a horizontal direction, so as to extract the lane marking characteristic pattern. The structural element has a length twice a width of the lane marking in the road image.

In some possible embodiments of the present disclosure, the binarization module may include a first calculation module and a first judgment module. The first calculation module is configured to, with respect to each pixel in the lane marking characteristic pattern, calculate a difference between an average grayscale value of the pixel and an average grayscale value of a pixel at the neighboring region. The first judgment module is configured to judge whether or not the difference is greater than a predetermined threshold, in the case that the difference is greater than the predetermined threshold, set a grayscale value of the pixel as 255, and otherwise set the grayscale value of the pixel as 0.

In some embodiments of the present disclosure, the second extraction module may include a second calculation module, an establishment module, a first determination module and a third extraction module. The second calculation module is configured to calculate a statistical attribute of each image block in the binary image, and the statistical attribute may include, but not limited to, one or more of center of mass, perimeter, area, direction, Euler number, eccentricity, length of principal axis, length of secondary axis, and a ratio of the length of principal axis to the length of secondary axis. The establishment module is configured to establish a regression decision tree model in accordance with the statistical attribute and the lane marking characteristic. The first determination module is configured to determine whether or not the image block is the lane marking in accordance with the regression decision tree model. The third extraction module is configured to extract a position of the image block that has been determined as the lane marking, and an angle of the image block relative to the running direction of the vehicle.

In some possible embodiments of the present disclosure, the first judgment unit may include a second judgment module and a second determination module. The second judgment module is configured to judge whether or not the running direction of the vehicle is being changed in accordance with the steering information of the vehicle. The second determination module is configured to, in the case that the running direction of the vehicle is being changed, the lane marking is located at a predetermined region in the road image, and the angle of the lane marking relative to the running direction of the vehicle is within a predetermined range, determine that the vehicle is unconsciously running on the lane marking.

It should be appreciated that, in the case of sending a warning, the lane departure warning device has been illustrated hereinabove merely on the basis of the above functional modules. During the actual application, the above-mentioned functions may be achieved by different functional modules according to the practical need, i.e., the lane departure warning device may include different functional modules, so as to achieve all of or parts of the above-mentioned functions.

The present disclosure further provides in some embodiments a vehicle assistant driving system, which at least including the above-mentioned lane departure warning device.

It should be appreciated that, the vehicle assistant driving system may further include any other known structures, which will not be particularly defined herein.

The above-mentioned device may be used to implement the above-mentioned method, with similar technical principles, similar technical problems to be solved and similar technical effects to be generated. It should be appreciated that, for ease of description, an operating procedure of the device may refer to that mentioned in the embodiments about the method, and thus will not be particularly defined herein.

It should be appreciated that, although the device and the method in the embodiments of the present disclosure have been separately described hereinbefore, details in the embodiments about the device may also be applied to the embodiments about the method. Names of the modules or steps involved in the embodiments of the present disclosure are merely provided to differentiate the modules or steps, but shall not be construed as limiting the scope of the present disclosure. It should be further appreciated that, the modules or steps involved in the embodiments of the present disclosure may be further divided or combined. For example, the above-mentioned modules may be combined into one module, or further divided into more sub-modules.

The technical solutions in the embodiments of the present disclosure have been described in details. Although the principles and implementations have been described with reference to specific embodiments, these embodiments are merely provided to facilitate the understanding of the present disclosure. It should be appreciated that, based on these embodiments, any modification may be made without departing from the scope of the present disclosure.

It should be further appreciated that, the flow charts or block diagrams involved in the embodiments of the present disclosure are not limited to the forms mentioned above, and they may be divided or combined in any possible manner.

It should be further appreciated that, signs and words in the drawings are merely used to facilitate the understanding of the present disclosure, but shall not be construed as limiting the scope of the present disclosure.

Through the above-mentioned description, it may be apparent for a person skilled in the art that the present disclosure may be implemented by hardware, or by software as well as a necessary common hardware platform, and in many cases, the latter may be a preferred one. Based on this understanding, the technical solutions of the present disclosure, or a portion of the technical solutions contributing to the related art may appear in the form of computer software products. Computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions may be executed by the processor of the computer or the other programmable data processing devices so as to create a device to achieve the functions assigned in one or more work flows in the flow chart and/or one or more blocks in the block diagram.

Although with the above-mentioned descriptions, it should be appreciated that, a person skilled in the art may make various modifications, substitutions or improvements without departing from the spirit of the present disclosure, and these modifications, substitutions or improvements shall also fall within the scope of the present disclosure.

The invention claimed is:

1. A lane departure warning method, an imaging device being arranged on a central axis of a front windshield of a vehicle, the lane departure warning method at least comprising steps of:
    collecting a road image by the imaging device;
    detecting a lane marking in accordance with the road image, so as to extract a position of the lane marking and an angle of the lane marking relative to a running direction of the vehicle;
    acquiring steering information and a movement speed of the vehicle by an On-Board Diagnostic (OBD) system;
    judging whether or not the vehicle is unconsciously running on the lane marking in accordance with the position of the lane marking, the angle of the lane marking relative to the running direction of the vehicle and the steering information of the vehicle;
    in the case that the vehicle is unconsciously running on the lane marking, recording a duration within which the vehicle is unconsciously running on the lane marking; and
    judging whether or not to send a lane departure warning to the vehicle in accordance with the duration within which the vehicle is unconsciously running on the lane marking and the movement speed of the vehicle.

2. The lane departure warning method according to claim 1, wherein the step of detecting the lane marking in accordance with the road image so as to extract the position of the lane marking and the angle of the lane marking relative to the running direction of the vehicle comprises:
    subjecting the road image to pretreatment;
    subjecting a pretreatment result to morphological operation so as to extract a lane marking characteristic pattern;
    subjecting the lane marking characteristic pattern to topical self-adaptive binarization, so as to acquire a binary image; and
    subjecting the binary image to Blob analysis, so as to determine an image block that conforms to a lane marking characteristic as the lane marking, and extract the position of the lane marking and the angle of the lane marking relative to the running direction of the vehicle.

3. The lane departure warning method according to claim 2, wherein the step of subjecting the road image to the pretreatment comprises:
    selecting a region-of-interest (ROI) from the road image;
    subjecting the ROI to gray processing;
    subjecting an image acquired after the gray processing to low-pass filtration; and
    subjecting an image acquired after the low-pass filtration to contrast adjustment.

4. The lane departure warning method according to claim 2, wherein the step of subjecting the pretreatment result to the morphological operation so as to extract the lane marking characteristic pattern comprises subjecting the road image to top-hat operation using a structural element in a horizontal direction, and the structural element has a length twice a width of the lane marking in the road image.

5. The lane departure warning method according to claim 2, wherein the step of subjecting the lane marking characteristic pattern to the topical self-adaptive binarization so as to acquire the binary image comprises:
    with respect to each pixel in the lane marking characteristic pattern, calculating a difference between an average grayscale value of the pixel and an average grayscale value of a pixel at the neighboring region;
    determining whether or not the difference is greater than a predetermined threshold; and
    in the case that the difference is greater than the predetermined threshold, setting a grayscale value of the pixel as 255, and otherwise setting the grayscale value of the pixel as 0.

6. The lane departure warning method according to claim 2, wherein the step of subjecting the binary image to the Blob analysis, so as to determine the image block that conforms to the lane marking characteristic as the lane marking, and extract the position of the lane marking and the angle of the lane marking relative to the running direction of the vehicle comprises:
    calculating a statistical attribute of each image block in the binary image, the statistical attribute comprising, but not limited to, one or more of center of mass, perimeter, area, direction, Euler number, eccentricity, length of principal axis, length of secondary axis, and a ratio of the length of principal axis to the length of secondary axis;

establishing a regression decision tree model in accordance with the statistical attribute and the lane marking characteristic;

determining whether or not the image block is the lane marking in accordance with the regression decision tree model; and extracting a position of the image block that has been determined as the lane marking, and an angle of the image block relative to the running direction of the vehicle.

7. The lane departure warning method according to claim 1, wherein the step of judging whether or not the vehicle is unconsciously running on the lane marking in accordance with the position of the lane marking, the angle of the lane marking relative to the running direction of the vehicle and the steering information of the vehicle comprises:

judging whether or not the running direction of the vehicle is being changed in accordance with the steering information of the vehicle; and in the case that the running direction of the vehicle is being changed, the lane marking is located at a predetermined region in the road image, and the angle of the lane marking relative to the running direction of the vehicle is within a predetermined range, determining that the vehicle is unconsciously running on the lane marking.

8. A lane departure warning device, an imaging device being arranged on a central axis of a front windshield of a vehicle, the lane departure warning device at least comprising:

a collection unit configured to collect a road image by the imaging device;

an extraction unit configured to detect a lane marking in accordance with the road image, so as to extract a position of the lane marking and an angle of the lane marking relative to a running direction of the vehicle;

an acquisition unit configured to acquire steering information and a movement speed of the vehicle by an On-Board Diagnostic (OBD) system;

a first judgment unit configured to judge whether or not the vehicle is unconsciously running on the lane marking in accordance with the position of the lane marking, the angle of the lane marking relative to the running direction of the vehicle and the steering information of the vehicle;

a recording unit configured to, in the case that the vehicle is unconsciously running on the lane marking, record a duration within which the vehicle is unconsciously running on the lane marking; and a second judgment unit configured to judge whether or not to send a lane departure warning to the vehicle in accordance with the duration within which the vehicle is unconsciously running on the lane marking and the movement speed of the vehicle.

9. The lane departure warning device according to claim 8, wherein the extraction unit comprises:

a pretreatment module configured to subject the road image to pretreatment;

a first extraction module configured to subject a pretreatment result to morphological operation so as to extract a lane marking characteristic pattern;

a binarization module configured to subject the lane marking characteristic pattern to topical self-adaptive binarization, so as to acquire a binary image; and a second extraction module configured to subject the binary image to Blob analysis, so as to determine an image block that conforms to a lane marking characteristic as the lane marking, and extract the position of the lane marking and the angle of the lane marking relative to the running direction of the vehicle.

10. The lane departure warning device according to claim 9, wherein the pretreatment module comprises:

a selection module configured to select a region-of-interest (ROI) from the road image;

a gray processing module configured to subject the ROI to gray processing;

a filtration module configured to subject the image acquired after the gray processing to low-pass filtration; and an adjustment module configured to subject the image acquired after the low-pass filtration to contrast adjustment.

11. The lane departure warning device according to claim 9, wherein the first extraction module comprises an operation module configured to subject the road image to top-hat operation using a structural element in a horizontal direction, so as to extract the lane marking characteristic pattern, and the structural element has a length twice a width of the lane marking in the road image.

12. The lane departure warning device according to claim 9, wherein the binarization module comprises:

a first calculation module configured to, with respect to each pixel in the lane marking characteristic pattern, calculate a difference between an average grayscale value of the pixel and an average grayscale value of a pixel at the neighboring region; and a first judgment module configured to judge whether or not the difference is greater than a predetermined threshold, in the case that the difference is greater than the predetermined threshold, set a grayscale value of the pixel as 255, and otherwise set the grayscale value of the pixel as 0.

13. The lane departure warning device according to claim 9, wherein the second extraction module comprises:

a second calculation module configured to calculate a statistical attribute of each image block in the binary image, the statistical attribute comprising, but not limited to, one or more of center of mass, perimeter, area, direction, Euler number, eccentricity, length of principal axis, length of secondary axis, and a ratio of the length of principal axis to the length of secondary axis;

an establishment module configured to establish a regression decision tree model in accordance with the statistical attribute and the lane marking characteristic;

a first determination module configured to determine whether or not the image block is the lane marking in accordance with the regression decision tree model; and a third extraction module configured to extract a position of the image block that has been determined as the lane marking, and an angle of the image block relative to the running direction of the vehicle.

14. The lane departure warning device according to claim 8, wherein the first judgment unit comprises:

a second judgment module configured to judge whether or not the running direction of the vehicle is being changed in accordance with the steering information of the vehicle; and a second determination module configured to, in the case that the running direction of the vehicle is being changed, the lane marking is located at a predetermined region in the road image, and the angle of the lane marking relative to the running direction of the vehicle is within a predetermined range, determine that the vehicle is unconsciously running on the lane marking.

15. A vehicle assistant driving system, comprising at least the lane departure warning device according to claim 8.

* * * * *